United States Patent [19]
Jablonski

[15] 3,722,279
[45] Mar. 27, 1973

[54] APPARATUS FOR MEASURING FLUID FLOW

[75] Inventor: Jan Jablonski, London, England

[73] Assignee: Elliott Brothers (London)Limited, London, England

[22] Filed: May 11, 1970

[21] Appl. No.: 36,154

[30] Foreign Application Priority Data

July 9, 1969  Great Britain..........34,643/69
May 9, 1969   Great Britain..........23,752/69

[52] U.S. Cl. .............................................73/231 M
[51] Int. Cl.............................................G01f 1/00
[58] Field of Search.......................73/231 M, 194 M

[56] References Cited

UNITED STATES PATENTS 3,144,769  8/1964  Francisco, Jr...........73/231 M
3,344,666  9/1967  Rilett......................73/231 M
3,308,662  3/1967  Maurer...................73/231 M
3,407,657  10/1968 Maurer...................73/231 M

*Primary Examiner*—Richard C. Queisser
*Assistant Examiner*—John P. Beauchamp
*Attorney*—Misegades and Douglas

[57] ABSTRACT

In apparatus for measuring the mass rate of flow of a fluid by imparting an angular component of velocity to the fluid and measuring the flow rate in arbitrary time units, the angular velocity is imparted to the fluid by an impeller. In this invention the impeller is driven by a turbine which is driven by the fluid the rate of flow of which is to be measured. Valves are also provided so that some of the fluid will automatically bypass the turbine if the rate of fluid flow rises above a predetermined value. This arrangement enables the turbine speed to be maintained substantially constant over a very wide range of rates of fluid flow.

15 Claims, 7 Drawing Figures

APPARATUS FOR MEASURING FLUID FLOW

This invention relates to apparatus for measuring the mass rate of flow of a fluid.

This apparatus, which is essentially a measuring instrument, is of particular use in measuring the flow of fuel in an aircraft and measures the mass flow of fuel per unit time. The apparatus is required to give reliable information as to flow rate over an extremely wide range of flow rates and operating conditions and from this information the actual fuel consumed can be calculated.

A typical form of this apparatus comprises a conduit through which the fluid flows through flow straightening means which ensures that the fluid has virtually no angular velocity. Fluid from the flow straightening means then passes through an impeller which imparts angular velocity to the fluid. The impeller is rotated by drive means and is angularly displaceable with respect to a datum which is conveniently some rotating part of the drive means, or a rotating member driven by the drive means. In the usual form of this arrangement the impeller is coupled to the drive means by a helical or spiral spring so that under steady state conditions the impeller rotates at the same speed as the drive means and datum, but is displaced from the datum by an amount which is indicative of fluid flow. If the flow rate changes then the speed of rotation of the impeller, relative to the drive means, also changes but at all times the actual displacement of the impeller can be detected by electrical pick-offs, one responsive to the impeller and the other responsive to the drive means. These pick-offs provide signals which can be used to measure mass flow per time unit where the time unit has an arbitrary value.

The impeller can be driven by various means such as an electric motor or turbine and the drive can be through suitable gearing. It is not always necessary that the speed of the drive be kept substantially constant but since the apparatus has certain non-linear operating characteristics, keeping the drive speed substantially constant does avoid one variable factor.

A further point to be considered is the effect of heating of the apparatus by the actual fluid being measured and this is particularly important with aircraft, where the tendency is for fuel to be used at increasingly higher temperatures.

It is thus advantageous to avoid the use of an electric motor or gearing for the impeller drive since, apart from the effect of excessive heating of the motor, the cost of the apparatus can be reduced by avoiding the use of both the electric motor and the gearing.

According to one aspect of the invention apparatus for measuring the mass rate of flow of a fluid which comprises: a cylindrical housing through which, in operation, the fluid flows: a turbine having an annular arrangement of rotor blades around a central aperture within the housing, an impeller within the housing and coupled to the turbine rotor so that when the said rotor is driven by the fluid the impeller imparts an angular velocity to fluid in transit therethrough; reaction means for sensing the angular velocity imparted to the fluid by the impeller which reaction is a measure of the mass fluid flow rate; and a valve structure normally closing passage through the turbine rotor central aperture, the valve structure, when the flow rate exceeds a certain value, opening so as, depending on the flow rate, to enable fluid to pass through the central aperture to the impeller without transiting the rotor blades in such quantities as to ensure that the turbine and, hence, the impeller, rotate at a predetermined constant speed.

In order that the invention may be better understood, three embodiments thereof will now be described, by way of example, with reference to the accompanying drawings, which show the invention applied to apparatus for measuring the mass rate of flow of fuel of an aircraft.

Figure 1:
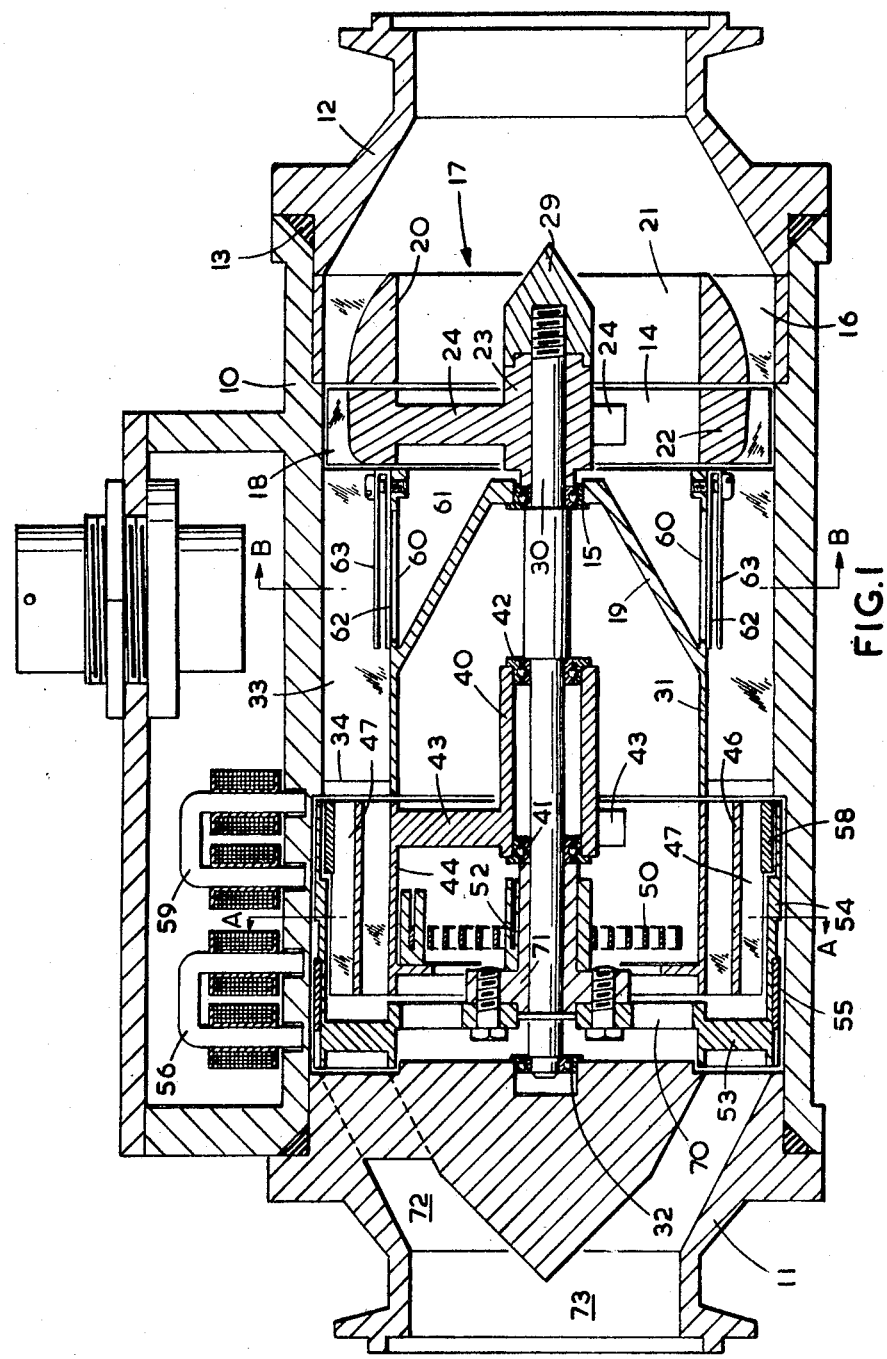
FIG. 1 is a longitudinal section through the apparatus and shows one embodiment of the invention.

In FIG. 1 the apparatus is shown as comprising a generally cylindrical housing 10 having two generally cylindrical end portions 11 and 12 secured thereto by means (not shown) and sealed by sealing rings 13.

The member 12 defines the fuel inlet path to the apparatus and carries the fixed blades 16 of a turbine generally indicated at 17, the rotor blades of the turbine being shown at 18. The fixed turbine blades 16 comprise part of a generally annular structure which includes an annular member 20 which defines a central aperture 21. The fixed blades 16 guide the fluid so that it flows axially to the rotor blades.

The rotor blades 18 are similarly part of an annular structure which includes an annular ring 22 supported from a central hub 23 by three equally spaced radial supports of which two are shown at 24, one being in section. The center of the turbine rotor thus has three central apertures between the supports. For convenience these three central apertures are described as "the central aperture" 14 of the rotor.

The turbine rotor is mounted on a shaft 30 which is supported in bearings 15 and 32. A cone-shaped boss 29 is screwed on the end of the shaft 30.

Immediately behind the turbine rotor there is disposed means which straightens the flow of fuel which has passed through the turbine rotor. This flow straightening means includes a number of fixed vanes and a stationary cylindrical support member 31 with an internal frustoconical part 19 which faces towards the turbine. The support member extends from adjacent the turbine rotor to an impeller to be described later. The flow straightening means includes an annular arrangement of vanes 33 which extend radially between the member 31 and the inside face of the housing 10 and these vanes extend axially for substantially the whole length of the member 31. In other respects the arrangement of the vanes can best be seen in FIG. 3.

As will be clearly appreciated, fuel flowing into the cylindrical housing end portion 12 flows through the turbine rotor and then through the flow straightening vanes 33 to the end of these vanes as indicated at 34. At this point the fuel should have virtually no angular velocity.

Also mounted on the shaft 30 is an impeller. This comprises a central cylindrical portion 40 which is rotatably mounted on the shaft 30 by bearings 41 and 42. The central portion 40 has extending therefrom a number of spokes, two of which are shown at 43, one in section. These spokes support an inner cylindrical part 44 of the impeller.

Figure 2:
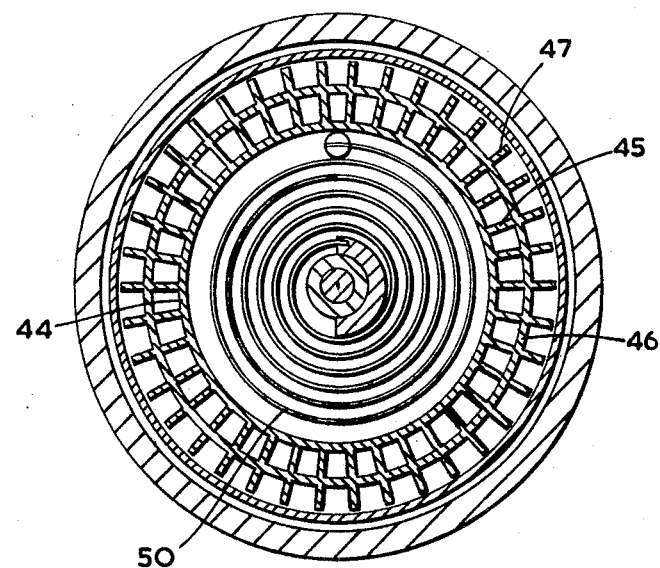
FIG. 2 is a section through FIG. 1 on the lines A—A thereof.

The construction of the impeller can best be seen by considering FIGS. 1 and 2 together. These Figures show the impeller as comprising an inner ring of vanes 45 supported on the inner cylindrical part 44, an outer cylindrical part 46 and an outer ring of vanes 47 extending radially outward from the ring 46.

The impeller is coupled to the shaft 30 by means of a spiral spring 50, or a number of springs can be employed. One end 51 of the spring is secured to the impeller and the other end 52 of the spring is secured to the shaft 30.

As the turbine rotates the impeller will also be rotated but since the impeller is coupled to the turbine shaft 30 by means of the spiral spring 50, the impeller speed will tend to vary and the angular position of the impeller will lag behind the turbine rotor, due to its imparting to the fuel an angular velocity. The spring or springs thus form reaction means for sensing the angular velocity imparted to the fluid. When the fuel flow rate varies the speed of rotation of the impeller relative to the turbine rotor will vary, but under steady state conditions the impeller speed will be the same as the turbine speed. The impeller will lag behind the rotor under all conditions of operation, but with an unchanging fuel flow rate its speed will be the same as that of the turbine.

Secured to the turbine shaft 30 adjacent the bearing 32 is a drum which includes the following parts: an inner cylindrical portion 71, radial spokes 70, an end ring 53 and an annular part 54 which extends from the end ring 53 back towards the turbine end of the apparatus and closely surrounds the impeller. It will be seen that the length of the drum is such that it completely surrounds the impeller so that, under steady state conditions, that is when the impeller and drum are rotating at the same speed, there is substantially no viscous drag on the impeller.

Fuel flowing from the impeller passes through apertures (not shown) in the end ring 53 of the drum and passes to outlet paths 72 and 73 in the housing end portion 11.

Mounted on the drum are two magnets 55 disposed 180° apart, and mounted on the impeller are two magnets 58 also disposed 180° apart.

The drum magnets 55 co-operate with an electrical pick-off generally shown at 56, and the impeller magnets 58 co-operate with an electrical pick-off generally shown at 59.

It will be appreciated that the co-operating magnets and pick-offs will provide electrical signals which are spaced by an amount indicative of the lag of the impeller relative to the turbine. By means of the signals provided by the pick-offs it is possible to measure, in arbitrary time units, the mass rate of flow of fuel through the apparatus. From this information it is possible to measure the actual fuel consumption. However, the general operation of this type of apparatus is known and it is not considered necessary to describe its functioning in detail.

It will be seen that use is made of the fuel to drive the turbine which in turn drives the impeller. Hitherto it has been known to use an electric motor in place of the turbine.

As is explained in the preamble to the specification, it is advantageous, if not essential, that the speed of the turbine is kept substantially constant, but obviously changes in the rate of flow of the fuel would change the speed of the turbine. In order to keep the turbine speed substantially constant, a number of bypass valves are provided, as follows.

The annular stationary member 31 has a number of slots 60 therein and these slots extend between the axially inner end of the frustoconical part 19 and an end ring 61 which forms part of the member 31 at the turbine end thereof. As can best be seen in FIG. 3, the slots 60 open into the spaces between adjacent ones of the flow straightening vanes 33. Each slot 60 is closed by a leaf spring 62 which has one end secured to the ring 61 with the other end thereof supported on the annular member 31. Each leaf spring 61 is prestressed so that in its position generally parallel to the axis of the apparatus it is under tension and can act as a self-closing flap valve.

If the flow rate of the fuel rises above a predetermined value, the free end of each leaf spring 62 will be lifted, so opening the associated slot 60 such that fuel can flow through the central aperture 21 of the turbine stator, through the central aperture 14 of the turbine rotor to flow directly into the flow straightening means and thence into the impeller.

By providing a suitable number of these leaf springs 62, the speed of the turbine can be kept substantially constant over a wide range of rates of fuel flow. Although the leaf springs 62 may have different spring rates and be prestressed to different values, the totality of these springs will, however, provide the desired speed control.

Figure 3:
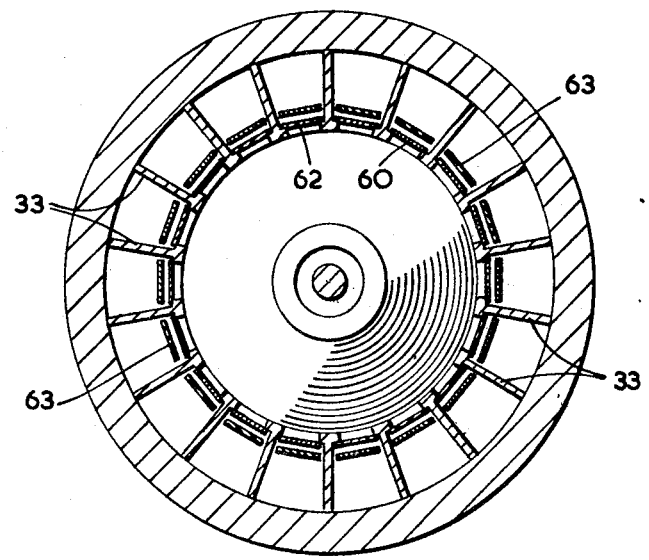
FIG. 3 is a section through FIG. 1 on the lines B—B thereof.

Although the single leaf springs 62 can provide a desired speed control, a better speed control can be achieved by the use of the two leaf springs as is shown in FIGS. 1 and 3. Above each leaf spring 62 there is an additional leaf spring 63, spaced from the leaf spring 62 and also secured to the end ring 61. Each spring 63 is in the path of deflection of its associated spring 62 and the force-deflection characteristic of each spring 62 is less than that of its associated spring 63. With this arrangement each inner leaf spring 62 is prestressed so as to prevent fuel passing into the flow straightening means at fuel pressures below a certain minimum value, as previously described. Each outer spring 63, being in the path of deflection of each leaf spring 62, comes into operation at fuel pressures in excess of a second predetermined minimum value when each inner spring 62 makes contact with each outer spring 63. By this means a finer control of the speed of the turbine can be achieved.

Figure 4:
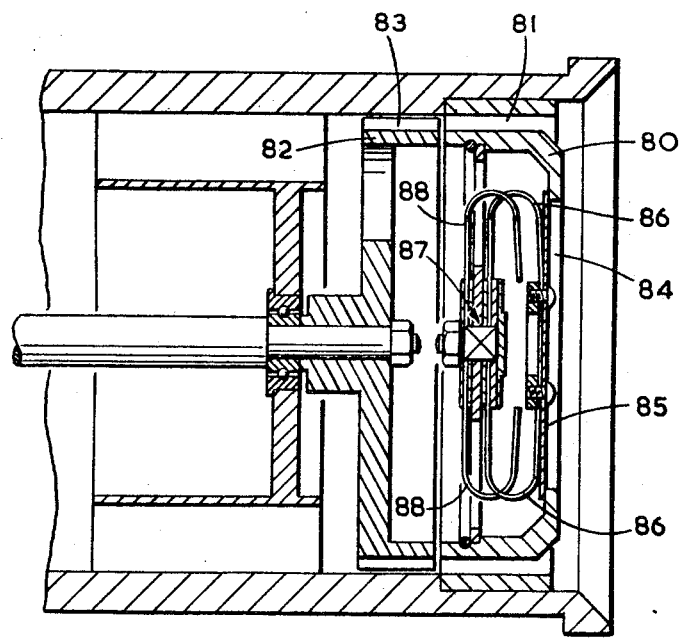
FIG. 4 shows a modification of the invention.

FIG. 4 shows a second embodiment of the invention in which only the turbine and valve means differ from the arrangement previously described in relation to FIGS. 1, 2 and 3. In FIG. 4 the turbine stator is shown at 80, the stator blades at 81, the rotor at 82 and the rotor blades at 83. The turbine stator is of different construction with a central aperture 84 which is shown closed by a plate 85.

In the FIG. 4 arrangement the normal flow path of the fuel is through the turbine stator and rotor blades to the flow straightening means (not shown) which can be identical to that previously described. The central aperture of the stator is closed by the plate 85 which is spring mounted, so that if the fuel flow rate rises above a predetermined value, the plate 85 is forced axially inwards to open the aperture 84 and allow fuel to bypass the turbine.

The plate 85 is mounted on leaf springs 86 secured to the inside of the plate 85 and to a central support structure, generally indicated at 87, within the turbine stator.

The leaf springs 86 function in the same manner as the leaf springs 62 of the embodiments of FIGS. 1, 2 and 3. However, optional leaf springs 88 can be provided behind the leaf springs 86 and disposed at an angle thereto. The arrangement of the double leaf springs 86 and 88 functions in the same manner as the arrangement of the double leaf springs 62 and 63.

Figure 5:
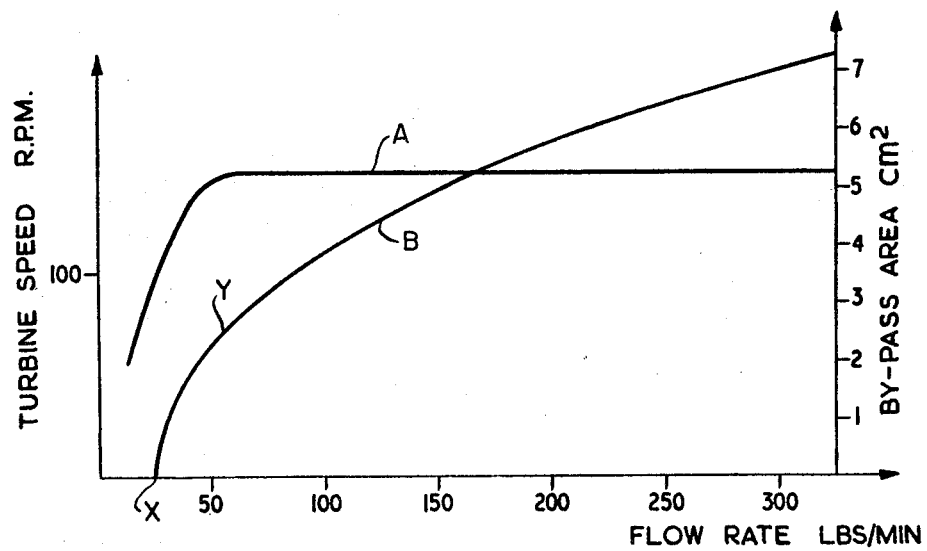
FIG. 5 is a graph which shows characteristics of part of the apparatus of the invention.

In FIG. 5, curve A shows the desired characteristic of the turbine rotor speed plotted as a function of the fluid flow rate. To obtain this characteristic, it has been found that the relation of the bypass area to the fluid flow rate must be as shown by curve B. As the bypass area is dependent on the deflection of the spring arrangement normally closing the bypass and the fluid flow produces the force necessary to deflect the spring arrangement, curve B can be considered as the necessary force/deflection characteristic of the spring arrangement.

Thus, it can be seen that at a force (i.e. a flow rate) below a certain value there should be no deflection of the spring arrangement. As the force increases above the certain value, the rate of change of deflection with respect to force must be high at first but decreases as the force increases further and the required turbine speed is reached.

Thus, in the double, spring arrangements shown in FIGS. 1 and 4, the springs 62 or 86 begin to deflect at point X. At point Y, the springs 62 or 86 contact the springs 63 or 88 causing them to begin deflecting.

Although it is possible to obtain a characteristic as shown by curve B using single springs instead of the double spring arrangement, such springs are liable to fatigue and failure over widely varying rates of fuel flow.

Figure 7:
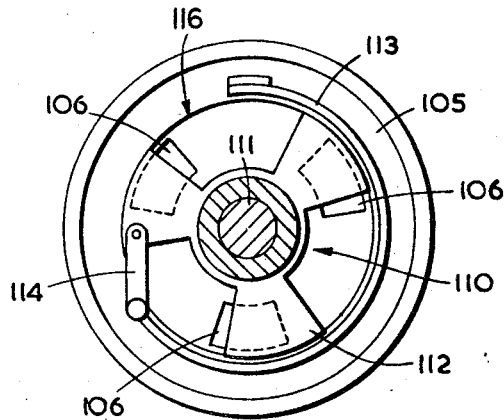
FIGS. 6 and 7 are diagrammatic and show an arrangement for compensating for temperature changes in the apparatus due to temperature changes of the fuel flowing through the apparatus.
Figure 6:
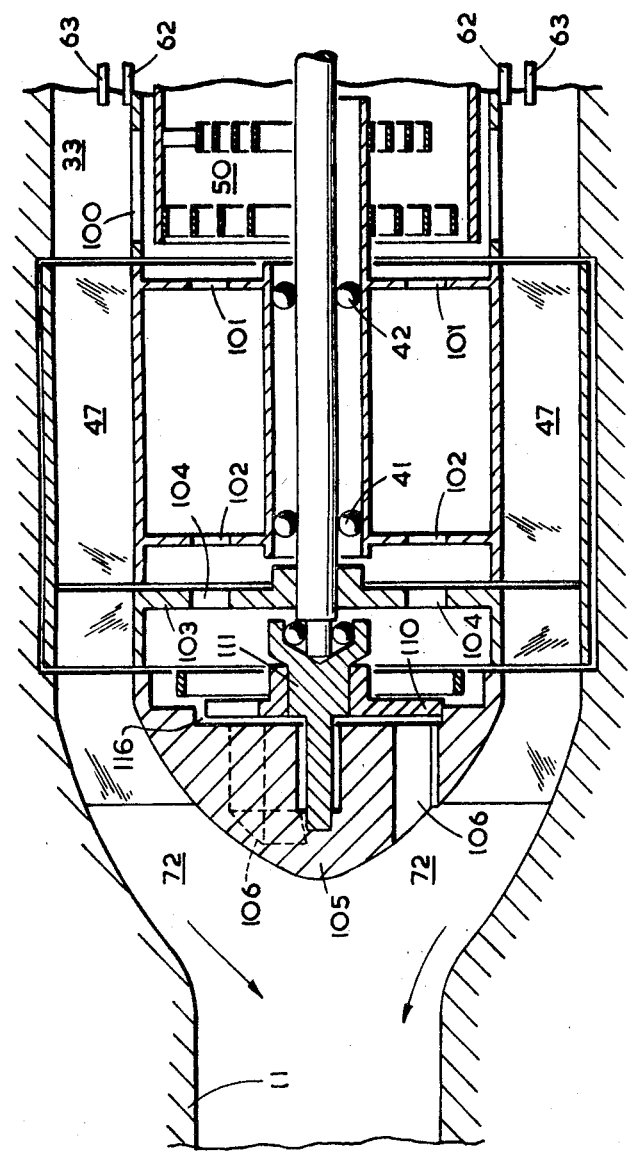

FIGS. 6 and 7 show an arrangement for compensating for temperature changes in the apparatus due to changes in temperature of the fuel flowing through the apparatus.

FIG. 6, which is diagrammatic, is a longitudinal section through part of apparatus similar to the apparatus of FIG. 1 and shows an arrangement which compensates for changes in the modulus of elasticity of the spiral spring due to changes in the temperature of the fuel. In FIG. 6 like parts are indicated by the like reference numerals of FIG. 1 and include the flow straightening vanes 33, the spiral spring 50, the shaft 30 with the shaft bearing 32, the impeller bearings 41 and 42, a single annular arrangement of impeller vanes 47 and the leaf springs 62 and 63.

Fuel passing from the impeller flows into passages (not shown) and thence into passages 72 in the housing end portion 11.

In order to compensate for changes in the modulus of elasticity of the spring 50, some of the fuel is allowed to bypass the impeller blades 47 and this fuel flows in the following paths. At the axially inner end of the impeller the cylindrical member 31 is provided with apertures 100. The central structure of the impeller of this arrangement is slightly different and is provided with passages 101 and 102. Adjacent the passages 102 the housing includes a central cylindrical plate 103 which is provided with apertures 104, opposite the apertures 102. The housing end portion 11 has a central end boss 105 and this is provided with three further apertures 106 best seen in FIG. 7. These apertures extend from the passages 72 back into the interior of the apparatus housing so that fluid can flow through the apertures 100, 101, 102, 104, 106 to the outlet passages 72, so bypassing the impeller.

The rate of flow of fluid through these bypass paths is controlled as follows. A shutter 110 is rotatably supported on a spigot 111 and is disposed in a recess 116 in the boss 105. The shutter has three radial arms 112 (FIG. 7) and a curved strip 113 of a bimetallic material has one end connected to the boss 105 and the other end thereof connected to the shutter 110 by a link 114.

It will be appreciated that movement of the bimetallic strip will rotate the shutter so that at a predetermined low temperature the apertures 106 will be completely obscured and will be progressively exposed to allow maximum flow of fuel at a predetermined high temperature.

Other constructions of the apparatus are possible in which the spiral spring 50 is replaced by a helical spring, and similarly the leaf spring valve arrangements could be replaced by any other form of resiliently biased valve member or members.

In a different form of the invention the bypass valves could be disposed around the outside of the turbine to allow bypass fuel to flow around the turbine and then into the flow straightening means.

The invention can obviously be used for measuring the flow rate of a fluid other than aircraft fuel.

I claim:

1. Apparatus for measuring the mass rate of flow of a fluid which comprises: a cylindrical housing through which, in operation, the fluid flows: a turbine having an annular arrangement of rotor blades around a central aperture within the housing, an impeller within the housing and coupled to the turbine rotor so that when the said rotor is driven by the fluid the impeller imparts an angular velocity to fluid in transit therethrough; reaction means for sensing the angular velocity imparted to the fluid by the impeller which reaction is a measure of the mass fluid flow rate; and a valve structure normally closing passage through the turbine rotor central aperture, the valve structure, when the flow rate exceeds a certain value, opening so as, depending on the flow rate, to enable fluid to pass through the central aperture to the impeller without transiting the rotor blades in such quantities as to ensure that the turbine and, hence, the impeller, rotate at a predetermined constant speed.

2. Apparatus according to claim 1 in which the preloaded valve structure comprises a stationary member which has at least one passageway normally closed by a pre-loaded spring arrangement.

3. Apparatus according to claim 2 in which there are a number of such passageways, each passageway being normally closed by a pre-loaded spring arrangement.

4. Apparatus according to claim 3 in which the spring arrangements have a non-uniform pressure/deflection characteristic and the pre-load for each such spring arrangement is substantially the same.

5. Apparatus according to claim 4 in which each spring arrangement comprises a leaf spring which bears against the stationary member so as to close a passageway and another spring which lies in the path of deflection of the said leaf spring; and the spring rate of the leaf spring is substantially less than the spring rate of the said other spring.

6. Apparatus according to claim 5 in which the said other spring comprises a second leaf spring.

7. Apparatus according to claim 1 in which the turbine includes an annular arrangement of stator blades around a central aperture and in which the pre-loaded valve structure comprises a resiliently biassed plate which normally prevents flow through the stator central aperture.

8. Apparatus according to claim 7 in which the plate is resiliently biased by a spring arrangement having a non-uniform force/deflection characteristic.

9. Apparatus according to claim 8 in which the spring arrangement comprises a first spring which bears against the plate and a second spring which lies in the path of deflection of the closure member so as after a certain deflection of the closure member to be engaged thereby; and the spring rate of the first spring is substantially less than the spring rate of the second spring.

10. Apparatus according to claim 1 in which the reaction means for sensing the angular velocity imparted to the fluid by the impeller comprises an elastic coupling between the turbine rotor and the impeller.

11. Apparatus according to claim 3, including a flow straightening means between the turbine rotor and the impeller.

12. Apparatus according to claim 11 in which the flow straightening means comprises a cylindrical support member having a plurality of axially extending vanes which project radially therefrom so as to define a plurality of circumferentially disposed longitudinally extending channels for the fluid.

13. Apparatus according to claim 12 in which the passageways are formed between at least some of the radially projecting vanes in the wall of the cylindrical support member; and the spring arrangements are effective for flow rates whose value is below that represented by the pre-load on the spring arrangements to close the passageways against the flow of fluid through the central aperture of the turbine rotor to the longitudinal extending channels of the flow straightening means.

14 Apparatus according to claim 11, including a temperature responsive arrangement responsive to the temperature of the fluid passing through the apparatus for compensating for changes in the modulus of elasticity of the elastic coupling between the turbine and the impeller.

15. Apparatus according to claim 14, in which the temperature responsive arrangement includes a bypass path which allows fluid to bypass the impeller, a rotor rotatable between positions in which the bypass path is fully opened or fully closed, and a bi-metallic strip subject to heating or cooling by the fluid flowing through the apparatus for controlling the rotor.

* * * * *